(12) United States Patent
Sridhar et al.

(10) Patent No.: US 8,161,541 B2
(45) Date of Patent: Apr. 17, 2012

(54) ETHERNET CONNECTIVITY FAULT MANAGEMENT WITH USER VERIFICATION OPTION

(75) Inventors: Kamakshi Sridhar, Plano, TX (US); Ludwig Pauwels, Beveren (BE); Sven Ooghe, Gentbrugge (BE)

(73) Assignee: Alcatel Lucent, Paris (FR)

( * ) Notice: Subject to any disclaimer, the term of this patent is extended or adjusted under 35 U.S.C. 154(b) by 1061 days.

(21) Appl. No.: 11/956,328

(22) Filed: Dec. 13, 2007

(65) Prior Publication Data

US 2009/0158388 A1 Jun. 18, 2009

(51) Int. Cl.
*H04L 29/06* (2006.01)
*G06F 11/00* (2006.01)
*G01R 31/08* (2006.01)

(52) U.S. Cl. .............. 726/14; 726/13; 713/168; 714/43; 370/242; 370/249

(58) Field of Classification Search .................. None
See application file for complete search history.

(56) References Cited

U.S. PATENT DOCUMENTS

| | | | | |
|---|---|---|---|---|
| 5,596,718 A * | 1/1997 | Boebert et al. | ................ | 726/16 |
| 5,822,435 A * | 10/1998 | Boebert et al. | ................ | 713/192 |
| 6,092,194 A * | 7/2000 | Touboul | ................ | 726/24 |
| 6,154,844 A * | 11/2000 | Touboul et al. | ................ | 726/24 |
| 6,804,780 B1 * | 10/2004 | Touboul | ................ | 713/181 |
| 7,475,239 B2 * | 1/2009 | Fulkerson et al. | ............ | 713/151 |
| 2005/0099949 A1 | 5/2005 | Mohan et al. | | |
| 2008/0235768 A1 * | 9/2008 | Walter et al. | ....................... | 726/3 |

FOREIGN PATENT DOCUMENTS

| | | |
|---|---|---|
| EP | 1734691 A1 | 12/2006 |
| WO | 2006076493 A2 | 7/2006 |

OTHER PUBLICATIONS

Technical Report "Migration to Ethernet-Based DSL Aggregation", DSL Forum TR-101, Apr. 2006, pp. 1-101.
ITU-T Y.1731 "OAM Functions and Mechanisms for Ethernet Based Networks", May 2006, pp. 1-80.
IEEE P802.1ag/D8 "Draft Standard for Local and Metropolitan Area Networks—Virtual Bridged Local Area Networks—Amendment 5: Connectivity Fault Management" Feb. 8, 2007, pp. 1-248.
Amit Cohen et al. "Efficient Method for Forwarding CFM Messages in N:1 VLANS", DSL Forum2007.809.00, Dec. 3, 2007, pp. 1-9.
PCT Search Report for PCT Patent Application No. PCT/US2008/086143 dated Mar. 26, 2009. William Marshall et al. "Carrier VoIP Security Architecture" Telecommunications Network Strategy and Planning Symposium, 2006, Networks 2006., 12th International, IEEE, PI, pp. 1-6, XP031014840, Nov. 1, 2006.
Dinesh Mohan "802.1ag Connectivity Fault Management Tutorial", retrieved from the Internet: URL:http://grouper.ieee.org/groups/802/802_tutorials/july04/802.1ag%20-%2OCFM%20Tutorial%20-%20Part%201%20v2.ppt (retrieved Sep. 26, 2005), pp. 1-21, Jul. 12, 2004.

* cited by examiner

*Primary Examiner* — Christopher Revak
(74) *Attorney, Agent, or Firm* — Capitol Patent & Trademark Law Firm, PLLC (57) ABSTRACT

An access node (e.g., DSLAM, OLT/ONT) is described herein that implements a trust verification method comprising the steps of: (a) filtering an up-stream message initiated by a non-trusted device (e.g., CPE); (b) intercepting the filtered up-stream message if the filtered up-stream message is a connectivity fault management message (e.g., LB message, LBR message, CC message); (c) inserting a trusted identification into the intercepted up-stream message; and (d) outputting the intercepted up-stream message with the inserted trusted identification. Thereafter, a trusted device (e.g., BRAS) receives and analyzes the outputted up-stream message with the inserted trusted identification message to ascertain a trustworthiness of the non-trusted device (e.g., CPE). Several different ways that an access network (e.g., IPTV network) can implement the trust verification method are also described herein.

20 Claims, 10 Drawing Sheets

| 0X0105 (VENDOX-SPECIFIC) || TAG_LENGTH |
|---|---|---|
| 0X00000DE9 (3561 DECIMAL, i.e. "ADSL FORUM" IANA ENTRY) |||
| 0X01 | LENGTH | AGENT CIRCUIT ID VALUE |
| AGENT CIRCUIT ID VALUE (CONT'D) |||
| 0X02 | LENGTH | AGENT REMOTE ID VALUE |
| AGENT REMOTE ID VALUE (CONT'D) |||

FIG. 11

ETHERNET CONNECTIVITY FAULT MANAGEMENT WITH USER VERIFICATION OPTION

TECHNICAL FIELD

The present invention relates to an access node (e.g., DSLAM, ONT/OLT) and method that enables an edge router (e.g., BRAS) to obtain a trusted verification of an end-user (e.g., CPE) by using in part Ethernet connectivity fault management messages (e.g., LBM messages, LBR messages, CC messages).

BACKGROUND

The following abbreviations are herewith defined, at least some of which are referred to in the following description associated with the prior art and the present invention.
BRAS Broadband Remote Access Server
BTV Broadcast Television
CC Continuity Check
DA Destination Address
DHCP Dynamic Host Configuration Protocol
DSL Digital Subscriber Line
DSLAM Digital Subscriber Line Access Multiplexer
IEEE Institute of Electrical and Electronics Engineers
IP Internet Protocol
IPTV Internet Protocol Television
LAN Local Area Network
LB Loopback
LBR Loopback Reply
LT Line Termination (customer-side of a DSLAM)
NT Network Termination (network-side of a DSLAM)
MA Maintenance Association
MAC Media Access Control
MD Maintenance Domain
MEP Maintenance End Point
OAM Operation, Administration and Maintenance
OLT Optical Line Termination
ONT Optical Network Termination
PON Passive Optical Network
RGW Residential Gateway
TLV Type-Length-Value
TV Television Referring to FIGS. 1-2 (PRIOR ART), there are two block diagrams of a traditional access network 100 with Ethernet-based DSL aggregation (e.g., see DSL Forum TR-101). The traditional access network 100 (e.g., IPTV network 100) includes a regional network 102 which is coupled to an edge router 104 (e.g., BRAS 104 with ports 105) which is coupled to one or more aggregation nodes 106 (with ports 106a and 106b). The aggregation node(s) 106 are connected by an Ethernet access network 108 to multiple access nodes 110 (e.g., DSLAMs 110 each of which include a NT card 113 which has NT exterior-facing ports 113a and NT interior-facing ports 113b and a LT card 115 which has LT interior-facing ports 115a and LT exterior facing ports 115b). The DSLAMs 110 are connected to multiple CPEs 112 (RGWs 112) which in turn are associated with multiple customers 114 where there is normally one customer 114 associated with one CPE 112. In one application, the BRAS 104 transmits BTV traffic 118 (multiple TV channels 118) at the Ethernet level (level 2) downstream via the aggregation node(s) 106, the Ethernet access network 108, the DSLAMs 110, and the CPEs 112 to the customers 114. The basic architecture and functionality of the traditional access network 100 is well known to those skilled in the art but for additional details about this type of architecture reference is made to DSL Forum TR-101 Ethernet-based DSL aggregation dated April 2006 (the contents of which are hereby incorporated by reference herein).

Figure 1:
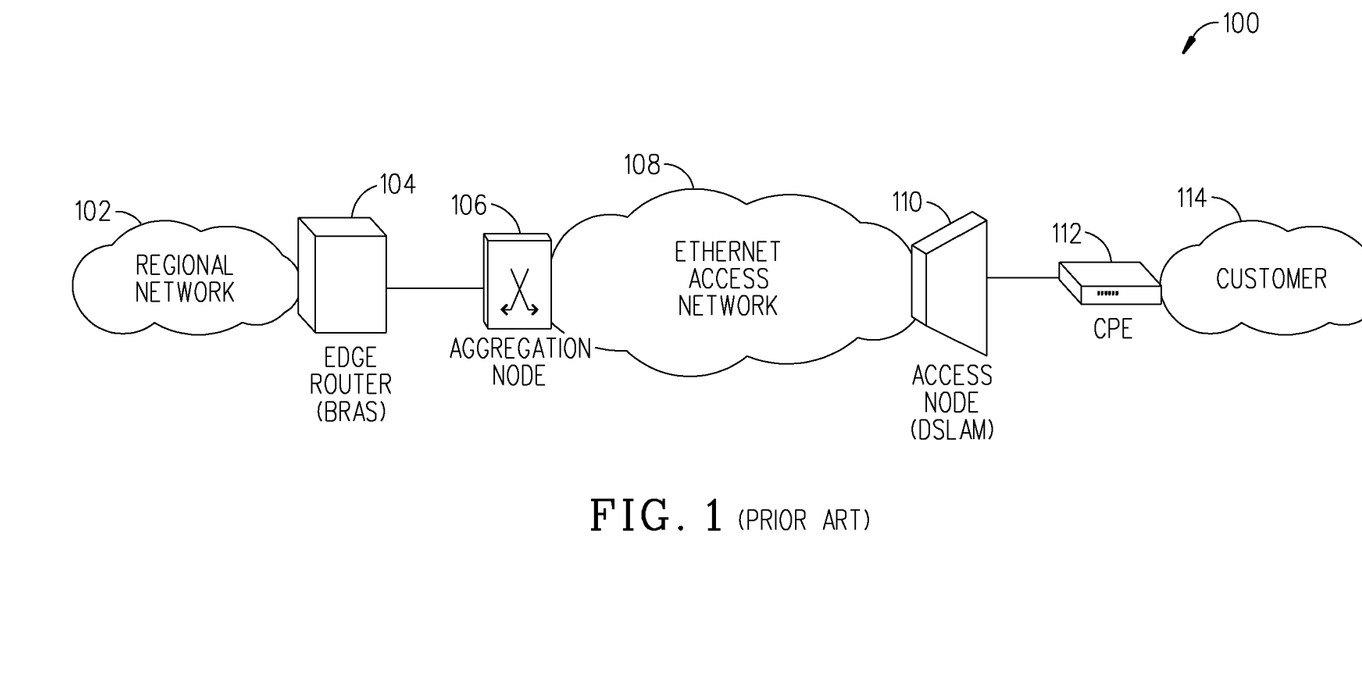
FIGS. 1-2 (PRIOR ART) are two diagrams of a traditional access network (e.g., IPTV network) which are used to help explain several problems that are solved by the present invention.
Figure 2:
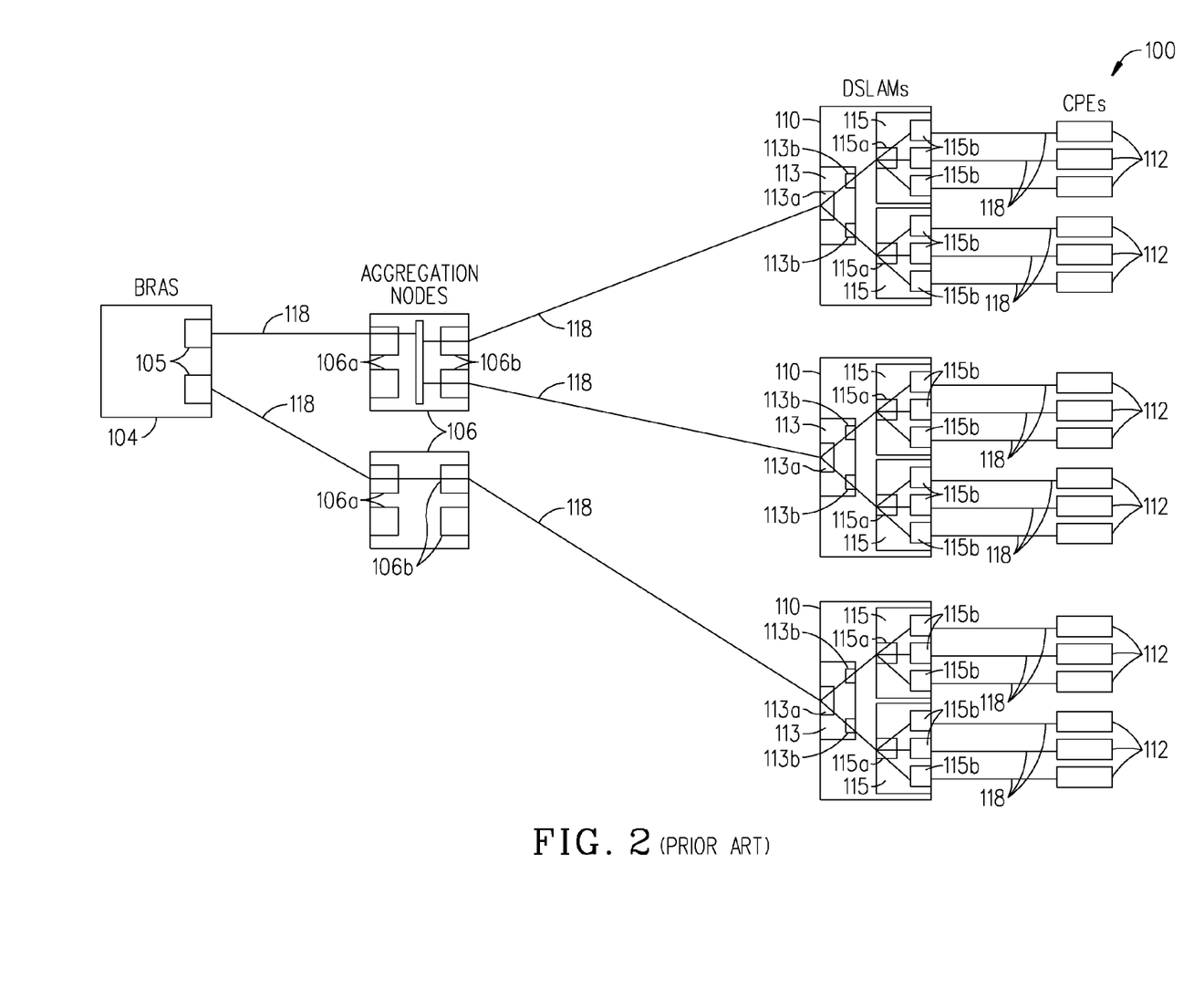

The traditional access network 100 typically implements a connectivity fault management scheme (EthCFM or EthOAM) that has been disclosed in the IEEE 802.1 ag/D8 standard entitled "Virtual Bridged Local Area Networks—Amendment 5: Connectivity Fault Management" Feb. 8, 2007 (the contents of which are incorporated by reference herein). The IEEE 802.1ag/D8 standard specifies protocols, procedures and managed objects that support connectivity fault management. These allow the discovery and verification of a path taken for frames addressed to and from specified network components like the BRAS 104 and the CPEs 112. As a result, connectivity faults can be detected and isolated to a specific component like one of the DSLAMs 110. Unfortunately, the traditional access network 100 when implementing this type of connectivity fault management scheme suffers from several problems:

1. The BRAS 104 periodically sends a multicast loopback (LB) message towards all of the CPEs 112 so as to discover the currently connected CPEs 112 and to obtain the MAC addresses of the currently connected CPEs 112. Upon receiving the LB message, the currently connected CPEs 112 respond by sending a unicast loopback response (LBR) message back towards the BRAS 104. The BRAS 104 receives many LBR messages from the currently connected CPEs 112. However, there is no current scheme that the BRAS 104 can use when analyzing the received LBR messages to verify the trustworthiness of the corresponding CPEs 112/customers 114.

2. The CPEs 112 often send CC messages towards the BRAS 104. Each CC message contains a MD/MA/MEP identification of the corresponding CPE 112. This MD/MA/MEP identification information is pre-configured at the BRAS 104. However, it is possible that a hacker can insert incorrect identifiers into CC messages which could disturb the OAM of the operator. For instance, the BRAS 104 could think a customer 114 (or business user 114) is still available because it receives messages from the MD/MA/MEP, while the customer 114 (or business user 114) might not be available and the messages are instead sent from a hacker.

Accordingly, there has been a need and still is a need for addressing these shortcomings and other shortcomings associated with the traditional access network 100 that implements the current connectivity fault management scheme. This need and other needs are satisfied by the present invention.

SUMMARY

In one aspect, the present invention provides an access node (e.g., DSLAM, OLT/ONT) that implements a trust verification method comprising the steps of: (a) filtering an up-stream message initiated by a non-trusted device (e.g., CPE); (b) intercepting the filtered up-stream message if the filtered up-stream message is a connectivity fault management message (e.g., LB message, LBR message, CC message); (c) inserting a trusted identification into the intercepted up-stream message; and (d) outputting the intercepted up-stream message with the inserted trusted identification. Thereafter, a trusted device (e.g., BRAS) receives the outputted up-stream message with the inserted trusted identification message and is able to ascertain a trustworthiness of the non-trusted device (e.g., CPE).

In another aspect, the present invention provides a method for obtaining a trusted verification of a non-trusted device (e.g., CPE) which is part of an access system that also includes a trusted edge router (e.g., BRAS) and a trusted access node (e.g., DSLAM, ONT/OLT). The method comprising the steps of: (a) sending a multicast loopback message from the edge router towards the non-trusted device; (b) sending a unicast loopback reply message from the non-trusted device after the non-trusted device receives the multicast loopback message; (c) intercepting the unicast loopback reply message at the access node; (d) inserting a trusted identification into the intercepted unicast loopback reply message at the access node; (e) outputting the unicast loopback reply message with the trusted identification from the access node; (f) receiving the outputted unicast loopback reply message with the trusted identification at the edge router; and (g) enabling the edge router to analyze the received unicast loopback reply message with the trusted identification to ascertain a trustworthiness of the non-trusted device.

In yet another aspect, the present invention provides a method for obtaining a trusted verification of a non-trusted device (e.g., CPE) which is part of an access system that also includes a trusted edge router (e.g., BRAS) and a trusted access node (e.g., DSLAM, ONT/OLT). The method comprising the steps of: (a) sending a connectivity fault management message (e.g., LB message, CC message) from the non-trusted device towards the edge router; (b) intercepting the connectivity fault management message at the access node; (c) inserting a trusted identification into the intercepted connectivity fault management message at the access node; (d) outputting the connectivity fault management message with the trusted identification from the access node; (e) receiving the outputted connectivity fault management message with the trusted identification at the edge router; and (f) enabling the edge router to analyze information in the received connectivity fault management message with the trusted identification to ascertain a trustworthiness of the non-trusted device.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 3:
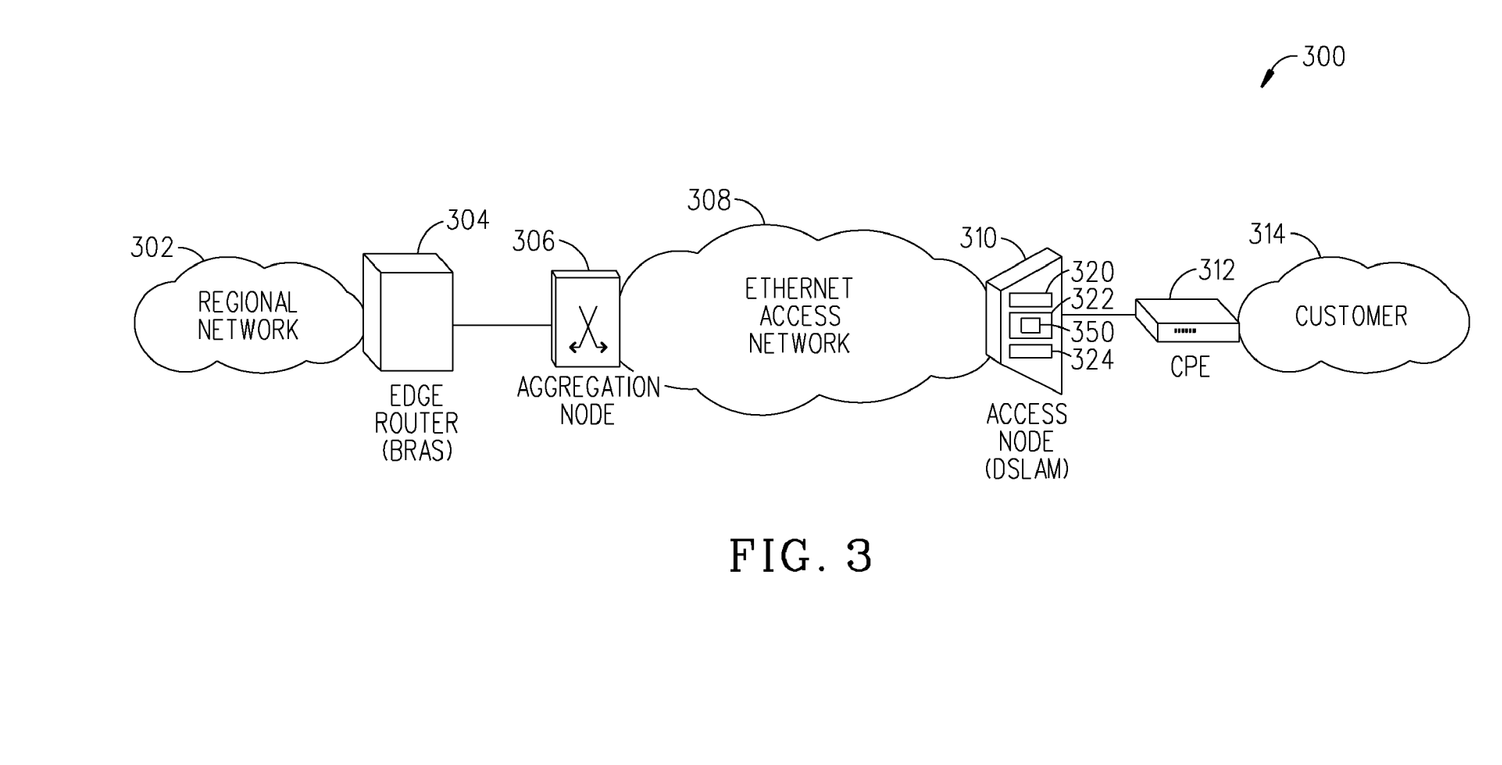
FIGS. 3-4 are two diagrams of an access network (with an Ethernet-based DSL aggregation) which has access nodes (e.g., DSLAMs) that solve the aforementioned problems by implementing a trust verification method in accordance with the present invention.
Figure 4:
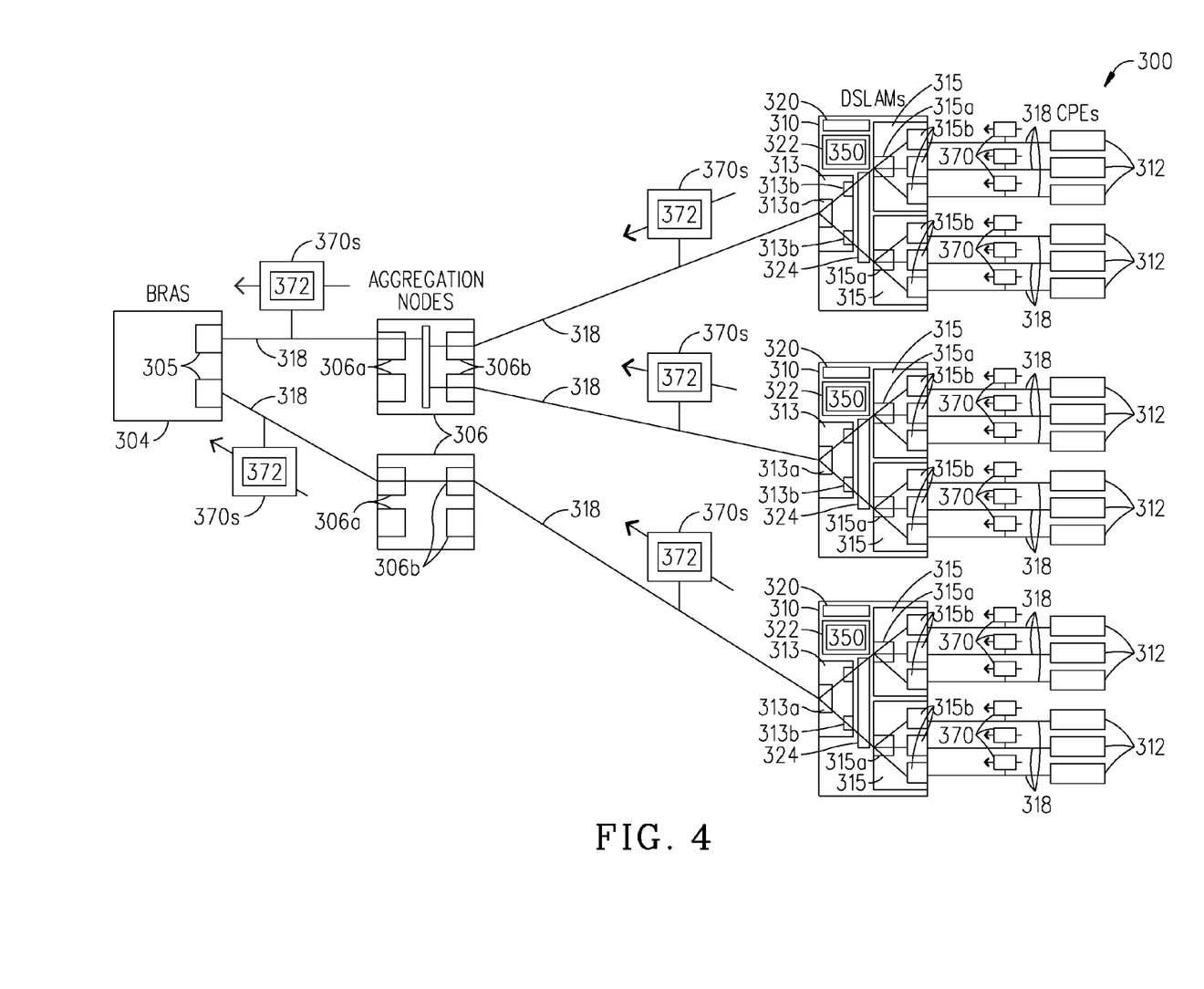

Referring to FIGS. 3-4, there are two block diagrams of an access network 300 (with an Ethernet-based DSL aggregation) which has access nodes 310 (e.g., DSLAMs 310) that implement a trust verification method 350 in accordance with the present invention (note: the present invention functions as well in an access network based on a PON model in which the DSLAM is replaced by an OLT and ONT). The access network 300 (e.g., IPTV network 300) includes a regional network 302 which is coupled to an edge router 304 (e.g., BRAS 304 with ports 305) which is coupled to one or more aggregation nodes 306 (with input ports 306a and output ports 306b). The aggregation node(s) 306 are connected by an Ethernet access network 308 to multiple access nodes 310 (e.g., DSLAMs 310 each of which include a NT card 313 which has NT exterior-facing ports 313a and NT interior-facing ports 313b and a LT card 315 which has LT interior-facing ports 315a and LT exterior facing ports 315b). The DSLAMs 310 are connected to multiple CPEs 312 (RGWs 312) which in turn are associated with multiple customers 314 where there is normally one customer 314 associated with one CPE 312. In one application, the BRAS 304 transmits BTV traffic 318 (multiple TV channels 318) at the Ethernet level (level 2) downstream via the aggregation node(s) 306, the Ethernet access network 308, the DSLAMs 310, and the CPEs 312 to the customers 314.

Figure 5:
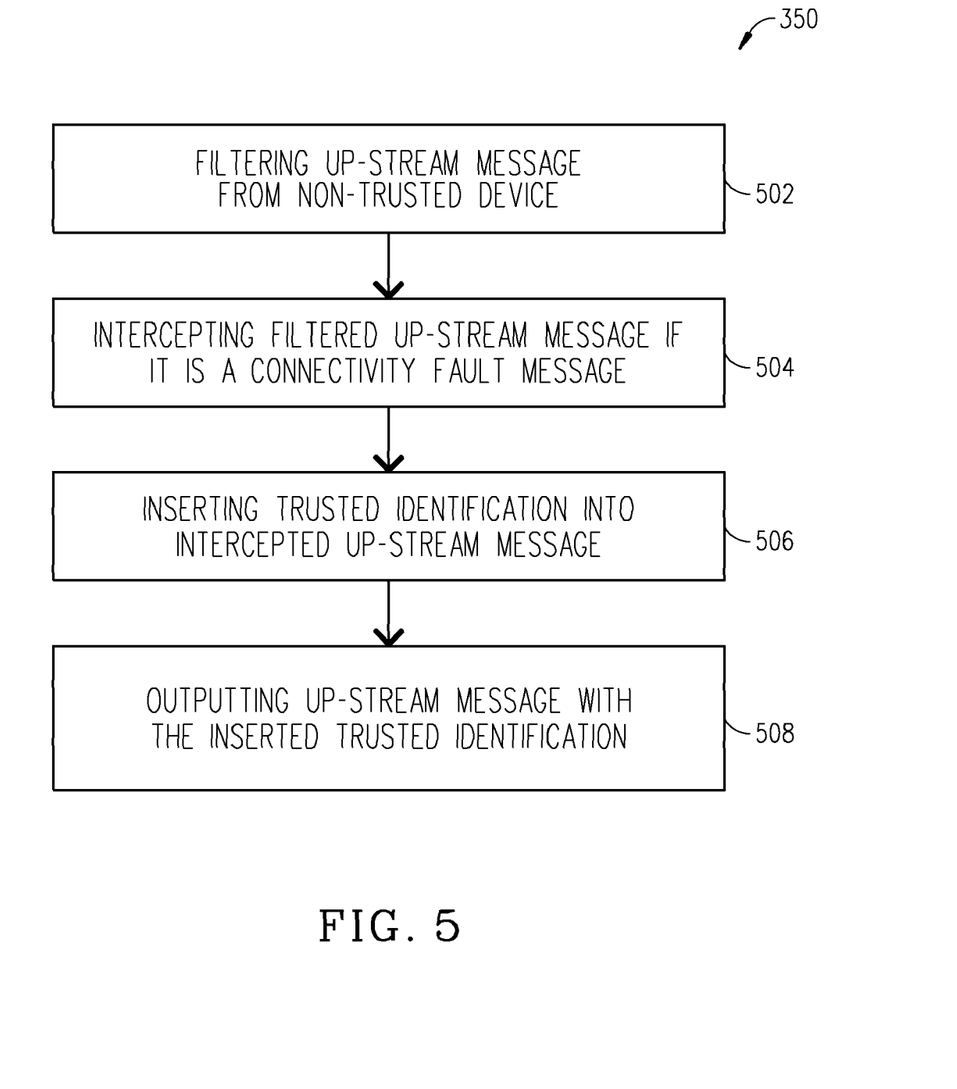
FIG. 5 is a flowchart illustrating the basic steps of the trust verification method in accordance with the present invention.

In the present invention, each access node 310 (which are trusted devices) has a processor 320 that retrieves instructions from a memory 322 and processes those instructions to implement the trust verification method 350 (see the flowchart in FIG. 5). In particular, each access node 310 implements the trust verification method 350 by having a filter 324 that filters up-stream messages 370 received from their corresponding CPEs 312 (which are non-trusted devices 312) (see step 502). Each access node 310 intercepts the filtered up-stream messages 370 if they are a connectivity fault management message such as, for example, a CCM message, a LB message, or a LBR message (see step 504) (note 1: from the standardized IEEE 802.1ag perspective these messages do not normally need processing inside the access node 310) (note 2: this step can be enabled or disabled as desired). In one example, each access node 310 can perform the intercepting operation by analyzing an Ethertype of each filtered up-stream message 370 to determine whether or not the filtered up-stream message 370 is a connectivity fault management message. Assuming the filtered up-stream messages 370 are connectivity fault management messages, each access node 310 inserts a trusted identification 372 into the intercepted up-stream messages 370 (see step 506). Then, each access node 310 outputs the intercepted up-stream messages 370 with the inserted trusted identification 372 towards the BRAS 304 (see step 508). Thereafter, the BRAS 304 analyzes the information in the received up-stream messages 370 with the trusted identifications 372 to ascertain a trustworthiness of the corresponding CPEs 312. This is possible because the access nodes 310 are trusted devices and each corresponding trusted identification 372 indicates a user port at the respective access node 310 behind which there is located the corresponding non-trusted CPE 312.

Figure 6:
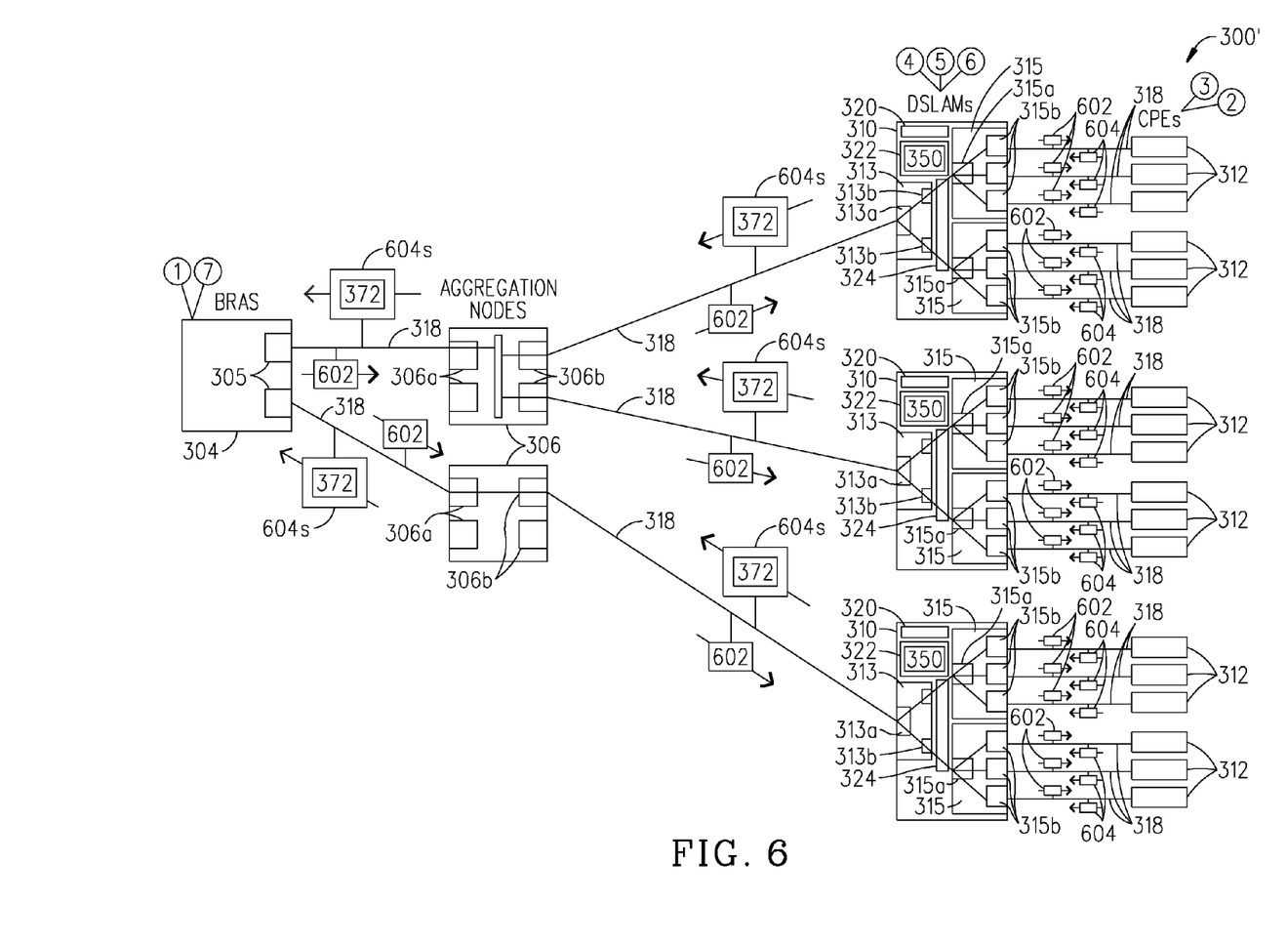
FIG. 6 is a diagram of an exemplary access network which is used to help explain how the trust verification method can be implemented in accordance with a first embodiment of the present invention.

Referring to FIG. 6, there is a block diagram of an exemplary access network 300' which is used to help explain how the trust verification method 350 can be implemented in accordance with a first embodiment of the present invention. The steps of how this particular embodiment of the trust verification method 350 can be implemented are as follows:

1. BRAS 304 sends a multicast LB message 602 towards the CPEs 312. The DSLAMs 310 do not insert the trusted identifications 372 into the LB message 602 because the LB message 602 is down-stream traffic and the BRAS 304 is a trusted device.

2. All of the CPEs 312 receive the LB message 602.

3. All of the CPEs 312 respond by sending unicast LBR messages 604 at spaced out intervals up-stream to the BRAS 304. The LB message 602 and the LBR messages 604 are described in ITU-T Recommendation Y.1731 entitled "OAM Functions and Mechanisms for Ethernet Based Networks" May 2006 (the contents of which are hereby incorporated by reference herein) (see also FIG. 9).

4. The DSLAMs 310 intercept the unicast LBR messages 604 (see steps 502 and 504).

Figure 11:
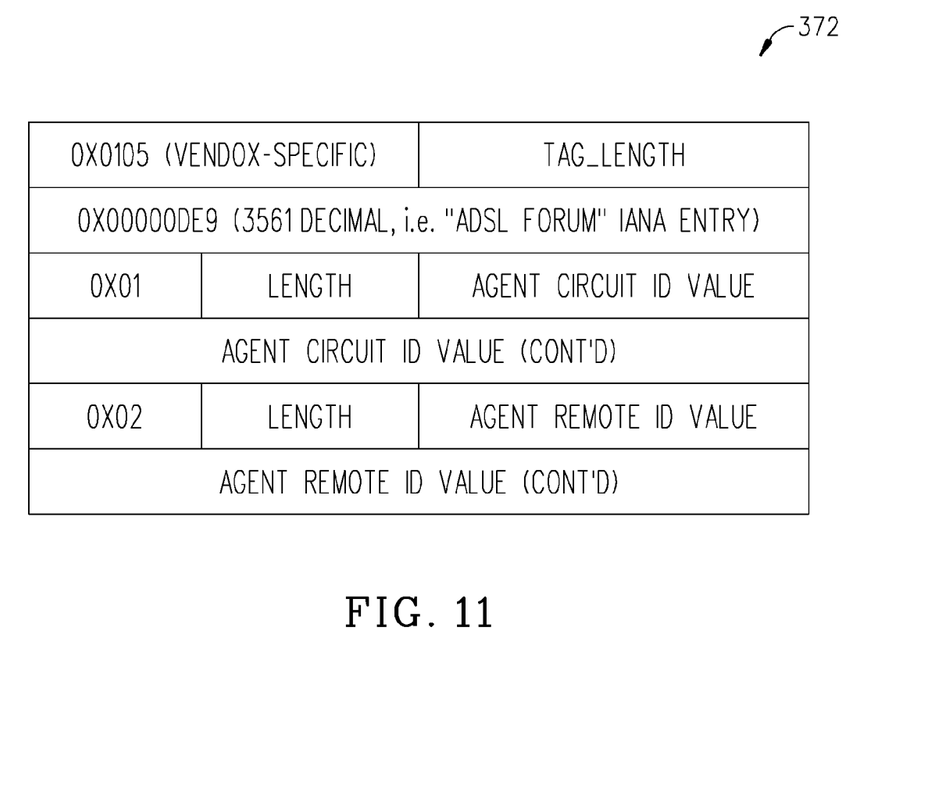
FIG. 11 is a diagram of an exemplary trusted identification "DHCP option 82" which can be placed within the LB message, LBR message or CC message in accordance with the present invention.

5. The DSLAMs 310 insert the trusted identifications 372 into the intercepted unicast LBR messages 604 (see step 506). Each trusted identification 372 indicates the user port 315b at the DSLAM 310 which corresponds to a particular LBR message 604 that was sent by a particular CPE 312. In one example, the DSLAMs 310 can insert a DHCP option 82 (trusted identification 372) into the up-stream LBR messages 604. The DHCP option 82 and other alternative trusted identifications 372 are discussed in greater detail below with respect to FIG. 11.

6. The DSLAMs 310 output the unicast LBR messages 604 with the trusted identifications 372 upstream towards the BRAS 304 (step 508).

7. The BRAS 304 receives the outputted unicast LBR messages 604 with the trusted identifications 372 and analyzes the information within each received unicast LBR message 604 to ascertain a trustworthiness of the corresponding CPE 312. In addition, the BRAS 304 upon receiving the LBR messages 604 which contain the trusted identification 372 can correlate the LBR messages 604 with subscriber data so the BRAS 304 can obtain additional knowledge about the connected CPEs 312. Plus, the BRAS 304 can learn the CPE's MAC address from the source MAC of each LBR message 604.

Figure 7:
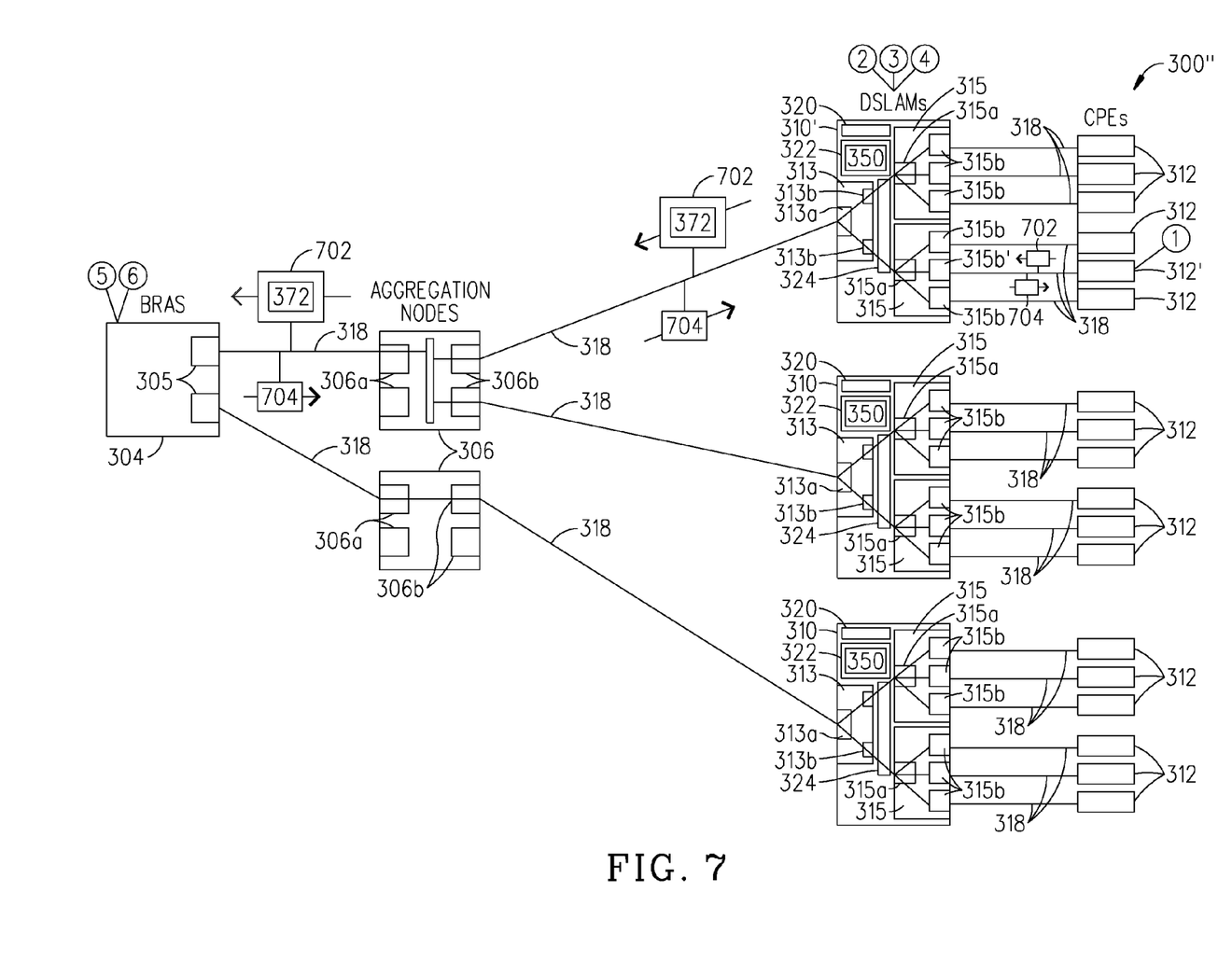
FIG. 7 is a diagram of an exemplary access network which is used to help explain how the trust verification method can be implemented in accordance with a second embodiment of the present invention.

Referring to FIG. 7, there is a block diagram of an exemplary access network 300" which is used to help explain how the trust verification method 350 can be implemented in accordance with a second embodiment of the present invention. The steps of how this particular embodiment of the trust verification method 350 can be implemented are as follows:

1. A CPE 312' sends a multicast LB message 702 towards to the BRAS 304.

2. The DSLAM 310' filters and intercepts the multicast LB message 702 (see steps 502 and 504).

3. The DSLAM 310' inserts the trusted identification 372 into the intercepted multicast LB message 702 (see step 506). The trusted identification 372 indicates the particular user port 315b' at the DSLAM 310' which received the multicast LB message 702 sent by the CPE 312'. In one example, the DSLAM 310' can insert a DHCP option 82 (trusted identification 372) into the received LB message 702. The DHCP option 82 and other alternative trusted identifications 372 are discussed in greater detail below with respect to FIG. 11.

4. The DSLAM 310' outputs the multicast LB message 702 with the trusted identification 372 upstream towards the BRAS 304 (step 508).

5. The BRAS 304 receives the outputted multicast LB message 702 with the trusted identification 372 and analyzes the information within the received LB message 702 to ascertain a trustworthiness of the CPE 312'. In view of this analysis, the BRAS 304 decides whether or not to reply where it may not reply if it does not recognize/identify the particular user interface/port 315b' in the DSLAM 310' which is associated with the CPE 312'.

6. Assuming the BRAS 304 decides to reply to the received multicast LB message 702 it will send a unicast LBR message 704 back to the CPE 312'.

Figure 8:
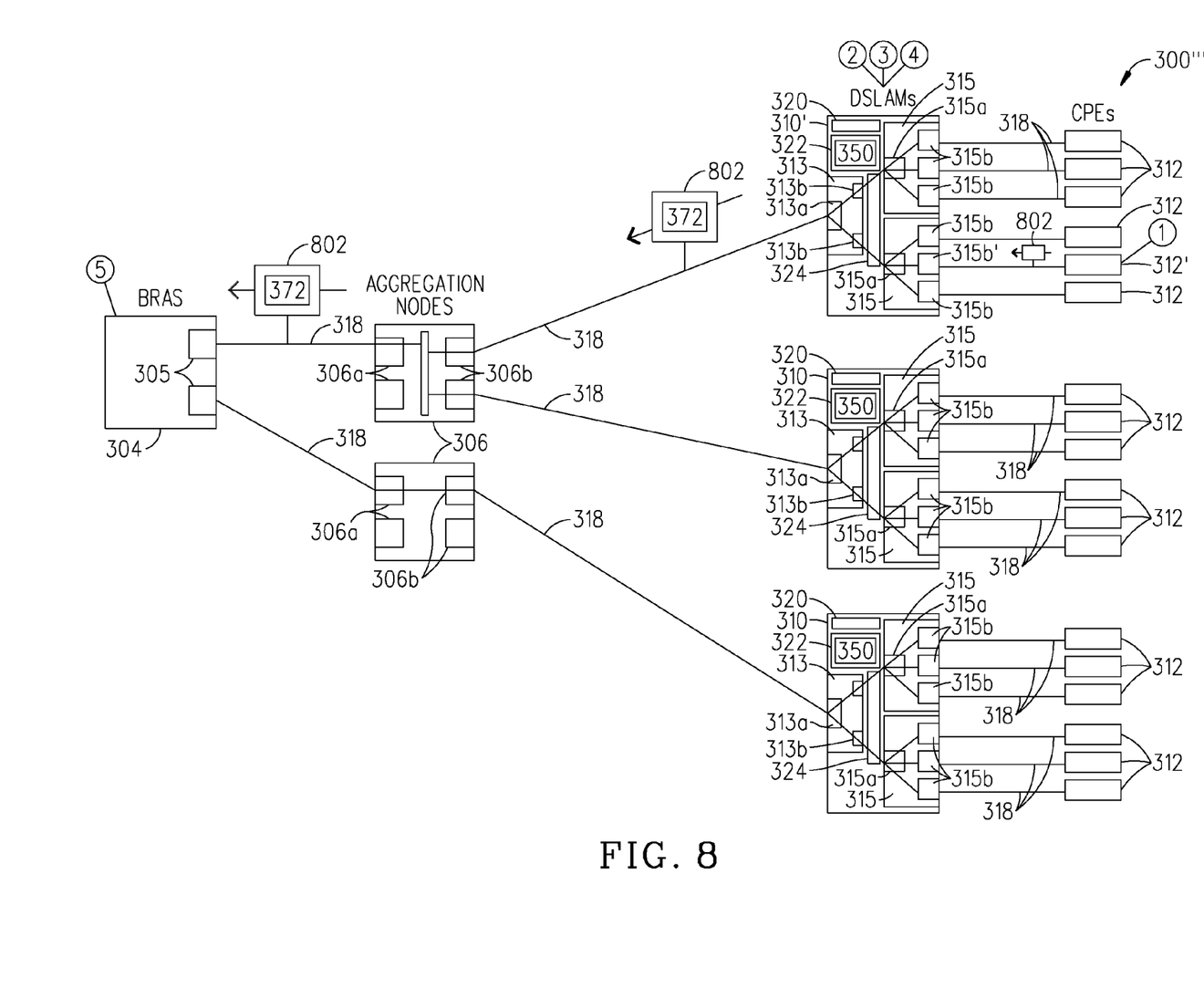
FIG. 8 is a diagram of an exemplary access network which is used to help explain how the trust verification method can be implemented in accordance with a third embodiment of the present invention.

Referring to FIG. 8, there is a block diagram of an exemplary access network 300''' which is used to help explain how the trust verification method 350 can be implemented in accordance with a third embodiment of the present invention. The steps of how this particular embodiment of the trust verification method 350 can be implemented are as follows:

1. A CPE 312' sends a multicast CC message 802 towards to the BRAS 304. The CC message 802 is described in the IEEE 802.1 ag/D8 standard entitled "Virtual Bridged Local Area Networks—Amendment 5: Connectivity Fault Management" Feb. 8, 2007 (the contents of which are incorporated by reference herein) (see FIG. 10).

2. The DSLAM 310' filters and intercepts the multicast CC message 802 (see steps 502 and 504).

3. The DSLAM 310' inserts the trusted identification 372 into the intercepted multicast CC message 802 (see step 506). The trusted identification 372 indicates the particular user port 315b' at the DSLAM 310' which received the multicast CC message 802 sent by the CPE 312'. In one example, the DSLAM 310' can insert a DHCP option 82 (trusted identification 372) into the CC message 802. The DHCP option 82 and other alternative trusted identifications 372 are discussed in greater detail below with respect to FIG. 11.

4. The DSLAM 310' outputs the multicast CC message 802 with the trusted identification 372 upstream towards the BRAS 304 (step 508).

5. The BRAS 304 receives the outputted multicast CC message 802 with the trusted identification 372 and analyzes the information within the received CC message 802 to ascertain a trustworthiness of the CPE 312'.

Figure 9:
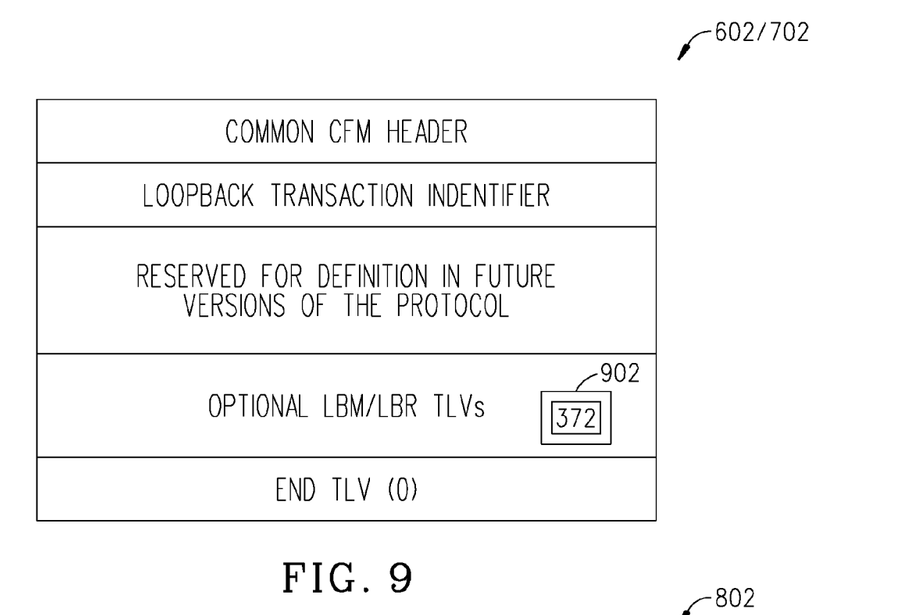
FIG. 9 is a diagram of a frame format of a LB/LBR message within which a trusted identification is placed by an access node when implementing the trust verification method in accordance with the present invention.
Figure 10:
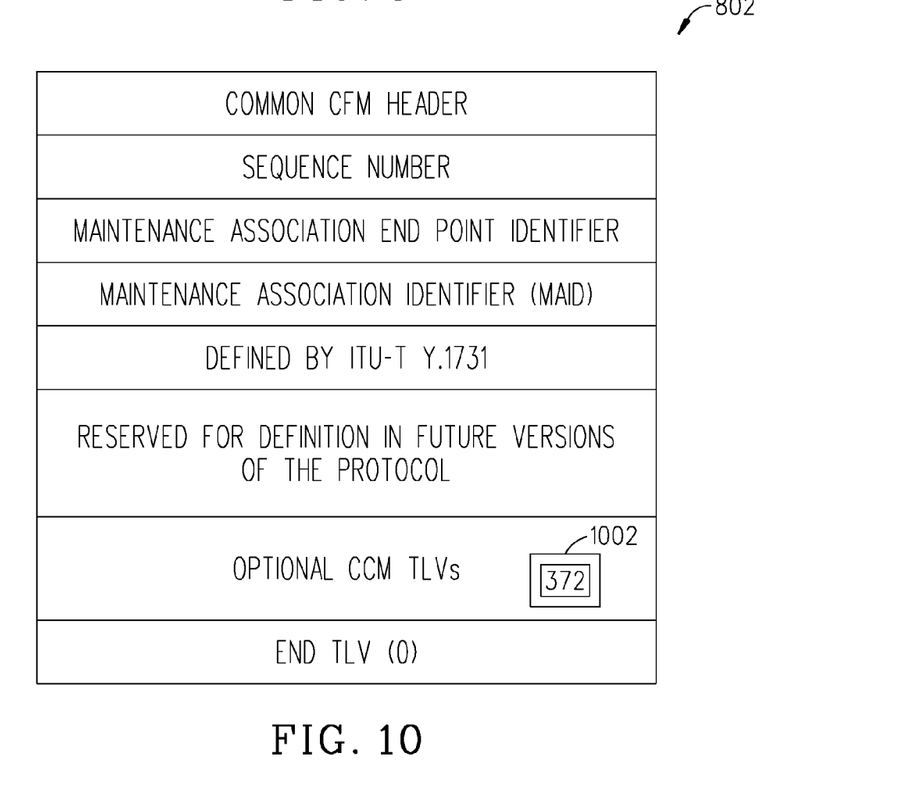
FIG. 10 is a diagram of a frame format of a CC message within which a trusted identification is placed by an access node when implementing the trust verification method in accordance with the present invention.

In each of the embodiments described above, it can be seen that the DSLAMs 310 inclusion of the trusted identification 372 in the upstream continuity check messages 370, 604, 702 and 802 provides reliable information to the BRAS 304. In particular, the BRAS 304 analyzes this reliable information to ascertain a trustworthiness of the corresponding CPEs 312 that sent the particular continuity check messages 370, 604, 702 and 802. If the continuity check messages 370, 604, 702 and 802 are LB messages, LBR messages and CC messages, then the DSLAM 310 can insert the trusted identification 372 into an organization specific tag which is configured to contain a vendor specific TLV (see the aforementioned DSL Forum TR-101). FIGS. 9 and 10 respectively illustrated the frame formats of the LB/LBR messages 604 and 702 and the CC messages 802 which are used to indicate where the DSLAM 310 can insert the trusted identification 372 into the organization specific tag 902 and 1002 in accordance with the present invention. In one example, the DSLAM 310 can use a DHCP option 82 as the trusted identification 372 where an exemplary DHCP option 82 has been shown in FIG. 11. The DHCP option 82 would be placed in the organization specific tag 902 and 1002 (vendor specific TLV) of the respective continuity check message 370, 604, 702 and 802. Alternatively, there are many different types of trusted identifications 372 that could be used instead of the DHCP option 82. For instance, the trusted identification 372 can be the MD/MA/MEP identification of an MEP within the trusted DSLAM 310. In fact, the trusted identification 372 can be any type of identification.

From the foregoing, it should be appreciated that the present invention relates to an access node 310 (e.g., DSLAM 310) and method 350 for enabling an edge router 304 (e.g., BRAS 304) to obtain a trusted verification of a non-trusted end device 312 (e.g., CPE 312) by using a trusted identification 372 and Ethernet connectivity fault management messages (e.g., LBM messages, LBR messages, CC messages). In addition, it should be appreciated that the present invention can be used in an access network (e.g., IPTV network) that is based on a PON model in which the DSLAM 310 would be replaced by an OLT and ONT. In fact, the present invention could be implemented in any network where a trusted device can add a trusted identification to a connectivity fault management message where the trusted identification has a relationship with the interface/port of the trusted device and as such indirectly identifies the non-trusted device that is located behind that interface/port at which the up-stream CFM message would be received.

An additional feature of the present invention is that if the access network 300 contains a BRAS 304 and DSLAMs 310 that are from the same manufacturer/organization then the IEEE 802.1ag standard would not need to be changed to implement the present invention because the BRAS 304 would be able to inspect the organization specific tag 902 and 1002 and retrieve the trusted identification 372 from the received continuity check messages 370, 604, 702 and 802. However, if the access network 300 contains a BRAS 304 and DSLAM 310 from different manufacturers/organizations then the IEEE 802.1ag standard would need to be changed so that the BRAS 304 will be able to inspect a non-organization specific tag to see if there is a trusted identification 372. As a result, the present invention may or may not need to be standardized depending on the choice of the frame format for the continuity check messages 370, 604, 702 and 802. In particular, the present invention may or may not need to be standardized depending on where the trusted identification 372 is placed within the continuity check messages 370, 604, 702 and 802.

Although several embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the spirit of the invention as set forth and defined by the following claims.

The invention claimed is:

1. A method for obtaining a trusted verification of a non-trusted device, said method comprising the steps of:
    filtering an up-stream message initiated by the non-trusted device;
    intercepting the filtered up-stream message if the filtered up-stream message is a connectivity fault management message;
    inserting a trusted identification into the intercepted up-stream message; and
    outputting the intercepted up-stream message with the inserted trusted identification.

2. The method of claim 1, wherein a trusted device performs the filtering step, the intercepting step, the inserting step and the outputting step.

3. The method of claim 2, wherein said trusted device includes a Digital Subscriber Line Access Multiplexer or an Optical Line Termination-Optical Network Termination.

4. The method of claim 2, wherein said trusted identification indicates a user port at the trusted device behind which there is located the non-trusted device, and wherein said trusted identification is a selected one of the following:
    a Dynamic Host Configuration Protocol (DHCP) option 82; and
    a MD/MA/MEP identification associated with the trusted device.

5. The method of claim 1, wherein said intercepting step further includes a step of analyzing an Ethertype of the filtered up-stream message to determine whether or not the filtered up-stream message is the connectivity fault management message.

6. The method of claim 1, wherein said connectivity fault management message includes a continuity check message, a loopback message, or a loopback reply message.

7. The method of claim 1, wherein said non-trusted device is a consumer premises equipment.

8. An access node, comprising:
    a processor; and
    a memory, where said processor retrieves instructions from said memory and processes those instructions to enable the following:
        filtering an up-stream message initiated by the non-trusted device;
        intercepting the filtered up-stream message if the filtered up-stream message is a connectivity fault management message;
        inserting a trusted identification into the intercepted up-stream message; and
        outputting the intercepted up-stream message with the inserted trusted identification.

9. The access node of claim 8, wherein said processor enables the intercepting operation by analyzing an Ethertype of the filtered up-stream message to determine whether or not the filtered up-stream message is the connectivity fault management message.

10. The access node of claim 8, wherein said connectivity fault management message includes a continuity check message, a loopback message, or a loopback reply message.

11. The access node of claim 8, wherein said trusted identification indicates a user port at the access node behind which there is located the non-trusted device, and wherein said trusted identification is a selected one of the following:
    a Dynamic Host Configuration Protocol (DHCP) option 82; and
    a MD/MA/MEP identification associated with the trusted device.

12. A method for obtaining a trusted verification of a non-trusted device which is part of an access system that also includes a trusted edge router and a trusted access node, said method comprising the steps of:
- sending a multicast loopback message from the edge router towards the non-trusted device;
- sending a unicast loopback reply message from the non-trusted device after the non-trusted device receives the multicast loopback message;
- intercepting the unicast loopback reply message at the access node;
- inserting a trusted identification into the intercepted unicast loopback reply message at the access node;
- outputting the unicast loopback reply message with the trusted identification from the access node;
- receiving the outputted unicast loopback reply message with the trusted identification at the edge router; and
- enabling the edge router to analyze the received unicast loopback reply message with the trusted identification to ascertain a trustworthiness of the non-trusted device.

13. The method of claim 12, wherein:
- said access node includes a Digital Subscriber Line Access Multiplexer or an Optical Line Termination-Optical Network Termination; and
- said non-trusted device is a consumer premises equipment.

14. The method of claim 12, wherein said intercepting step further includes a step of analyzing an Ethertype of the unicast loopback reply message to determine whether or not the unicast loopback reply message is a connectivity fault management message.

15. The method of claim 12, wherein said trusted identification indicates a user port at the access node behind which there is located the non-trusted device, and wherein said trusted identification is a selected one of the following:
- a Dynamic Host Configuration Protocol (DHCP) option 82; and
- a MD/MA/MEP identification associated with the trusted device.

16. A method for obtaining a trusted verification of a non-trusted device which is part of an access system that also includes a trusted edge router and a trusted access node, said method comprising the steps of:
- sending a connectivity fault management message from the non-trusted device towards the edge router;
- intercepting the connectivity fault management message at the access node;
- inserting a trusted identification into the intercepted connectivity fault management message at the access node;
- outputting the connectivity fault management message with the trusted identification from the access node;
- receiving the outputted connectivity fault management message with the trusted identification at the edge router; and
- enabling the edge router to analyze information in the received connectivity fault management message with the trusted identification to ascertain a trustworthiness of the non-trusted device.

17. The method of claim 16, wherein:
- said access node includes a Digital Subscriber Line Access Multiplexer or an Optical Line Termination-Optical Network Termination; and
- said non-trusted device is a consumer premises equipment.

18. The method of claim 16, wherein said connectivity fault management message is a continuity check message or a loopback message.

19. The method of claim 16, wherein said intercepting step further includes a step of analyzing an Ethertype of the connectivity fault management message.

20. The method of claim 16, wherein said trusted identification indicates a user port at the access node behind which there is located the non-trusted device, and wherein said trusted identification is a selected one of the following:
- a Dynamic Host Configuration Protocol (DHCP) option 82; and
- a MD/MA/MEP identification associated with the trusted device.

* * * * *